United States Patent [19]

Speer

[11] Patent Number: 5,264,242
[45] Date of Patent: Nov. 23, 1993

[54] METHOD AND COMPOSITION FOR RECOLORING WORN LEATHER AND LEATHER-LIKE CONSUMER PRODUCTS SUCH AS SHOES

[76] Inventor: Lawrence L. Speer, 440 W. Hopocan, Barberton, Ohio 44203

[21] Appl. No.: 836,754

[22] Filed: Feb. 19, 1992

[51] Int. Cl.$^5$ .................... B32B 35/00; B32B 19/00; B05D 3/00; B05D 1/28
[52] U.S. Cl. .................. 427/140; 427/323; 427/389; 427/429; 428/357; 134/42
[58] Field of Search ............ 427/140, 323, 389, 429; 428/357; 134/42

[56] References Cited

U.S. PATENT DOCUMENTS

| | | | |
|---|---|---|---|
| 3,895,134 | 7/1975 | Kigane et al. | 427/246 |
| 4,515,852 | 5/1985 | Katabe et al. | 524/507 |
| 5,061,517 | 10/1991 | Speer | 427/140 |

OTHER PUBLICATIONS

3M General Offices, Industrial Chemical Products Division, St. Paul, Minn.: Material Safety Date Sheet, "FC-120 Fluorad Brand Fluorochemical Surfactant", Document 10-3802-5, Dec. 18, 1990.
Rohm and Haas Company, Philadelphia, Pa. Material Safety Data Sheet: Acrysol (R) TT-678 Thickening Agent, Aug. 22, 1991.
Ashland Chemical, Inc., Drew Industrial Division, Boonton, N.J., Material Safety Data Sheet: Drewplus (TM) L 405 Foam Control Agent, Data Sheet No. 0187481-003, Mar. 26, 1991.
B. F. Goodrich Company, Specialty Polymers & Chemicals Division, Cleveland, Ohio, Material Safety Data Sheet: PU Latex, Document No. msd90.511, Jun. 15, 1990.
B. F. Goodrich Company, Specialty Polymers & Chemicals Division, Cleveland, Ohio, Material Safety Data Sheet: Hycar (R) Acrylic Lates, Document No. 85134, Jan. 1987.
U.S. Department of Labor, Occupational Safety and Health Administration, Washington, D.C., Material Safety Data Sheet: Stan-Tone (R) WD-3682 White, manufactured by Harwick Chemical Corporation, Akron, Ohio, OMB No. 1218-0072, Apr. 17, 1987.

*Primary Examiner*—Anthony McFarlane
*Assistant Examiner*—Nhat D. Phan
*Attorney, Agent, or Firm*—Cushman, Darby & Cushman

[57] ABSTRACT

An item of footwear which has become scuffed or worn, or which is to be protected against wear, on its leather or leather-like external surfaces, is subjected to a preliminary cleaning. Thereafter, a coating of polyurethane elastomer dispersed in water, and possibly extended by acrylic resin dispersed in water, further including a colorant, a defoamer and a wetting agent, is brushed or swabbed onto the surface. The water evaporates, leaving a thin, flexible, scuff-resistant coating, the color of which covers and hides discoloration and scuffs on the original surface.

7 Claims, No Drawings

METHOD AND COMPOSITION FOR RECOLORING WORN LEATHER AND LEATHER-LIKE CONSUMER PRODUCTS SUCH AS SHOES

BACKGROUND OF THE INVENTION

In my earlier U.S. patent application Ser. No. 07/440,081, filed Nov. 22, 1989 (now U.S. Pat. No. 5,061,517, issued Oct. 29, 1991) there is disclosed a coating composition and method for refinishing blemished, scuffed or worn leather and leather-like consumer articles such as shoes, handbags, briefcases, and the like. The coating composition disclosed is a polyester-type polyurethane elastomer dissolved in a solvent, that further includes a pigmented colorant. In practicing the method, the surface to be recolored, is first cleaned and wiped. Then, the coating composition is applied, e.g., by brushing it on, and it is allowed to dry. Typical solvents used in the composition include a 1:1 mixture of toluene and isopropyl alcohol, and methyl ethyl ketone and/or isobutyl ketone mixed with isopropyl alcohol.

It remains the inventor's position that the composition and method disclosed in the aforesaid earlier application are good ones that continue to be applicable in many circumstances. That composition and method made available to consumers, largely for the first time, convenient ways and means for providing durable recoloration for the external surfaces of worn shoes and the like, and particularly for providing coatings which will stand-up to water and common solvents.

However, the coating composition disclosed in the aforesaid earlier application is not without shortcomings. In particular, the use of a volatile organic solvent for dissolving the synthetic polymeric resin causes the product to be flammable, toxic and to emit an odor that some potential users find to be disagreeable. These drawbacks present labeling regulatory and consumer acceptance problems, despite the effectiveness of the product.

It has become clearer to the present inventor that, in order to effectively market a recoloration product to consumers for refinishing the exterior surfaces of worn shoes, handbags, briefcases and the like, it is highly desirable, if not essential, that the coating composition be nonflammable, relatively nontoxic, and that it not emit noxious solvent fumes while drying.

There are water-based shoe recoloring products currently on the market. However, they are based on acrylic resins and, therefore, are subject to a lack of durability. After a pair of shoes has been recolored by them and they have been dry for about two days, coating adhesion becomes poor and, therefore, the coating is subject to flaking-off. Also, the coating is easily removed by water, so that if the shoes become wet, the color will rub-off on surroundings.

SUMMARY OF THE INVENTION

An item of footwear which has become scuffed or worn, or which is to be protected against wear, on its leather or leather-like external surfaces, is subjected to a preliminary cleaning. Thereafter, a coating of polyurethane elastomer dispersed in water, and possibly extended by acrylic resin dispersed in water, further including a colorant, a defoamer and a wetting agent, is brushed or swabbed onto the surface. The water evaporates, leaving a thin, flexible, scuff-resistant coating, the color of which covers and hides discoloration and scuffs on the original surface.

DETAILED DESCRIPTION

The surfaces that can be recolored and/or protected using the process and coating material of the present invention are generally the external surfaces, subject to wear and discoloration, of leather and leather-like footwear such as one would ordinarily think to protect using shoe polish, leather protector, vinyl protector and the like.

In addition to leather (tanned animal skin), the following are examples of leather-like materials which can be protected using the method and coating material of the present invention: sneakers, tennis shoes, all types of men's and ladies' footwear, athletic shoes and equipment, belts, briefcases and other leather goods, as well as those made of synthetic or artificial leather, typically polyvinylchloride.

An initial step in practicing the method of the invention is cleaning the surface which is to be coated. The surface may be cleaned by applying a cleaning agent, and then wiping the surface. More than one cleaning agent can be used in succession or mixed together, and any convenient means may be used for applying the cleaning agent then wiping the surface, e.g., spraying, swabbing, dipping, followed by wiping with a cloth, sponge, squeegee or the like.

The preferred cleaning agent is acetone. In addition, the following are examples of cleaning agents which can be used: ethyl acetate, isopropyl alcohol, methyl ethyl ketone, methylisobutyl ketone, and soap or detergent, and water.

The coating composition used in the present invention includes a reacted polyurethane elastomer, dispersed in water, possibly acrylic resin dispersed in water, a pigmented colorant, a defoamer and a wetting agent.

The essential qualities of the polyurethane, are that it be stable in a water-based dispersion, and compatible with the other ingredients of the composition, and that it be capable of forming a film, that, when the water evaporates has a gloss typical of finished leather, in which the colorant remains evenly distributed, and is not substantially soluble in water, given expected wetting conditions (e.g., a wearer of recoated shoes becomes caught in a rain shower, or is prone to produce perspiration from their feet). Logically, if the polyurethane is dispersed in water in the composition, one would think that it may remain water soluble when coated onto a shoe or other consumer product. However, for the preferred material, once the composition has been coated onto the product and the water evaporates from it, the polyurethane forms a substantially continuous, flexible film which is not water soluble.

Typically useful as the polyurethane ingredient of the composition is B. F. Goodrich U21X urethane resin, which is believed to have the following composition:
  34–41% polyurethane
  50–65% water
  1–2% triethylamine
  3–13% N-methyl pyrolidone
Alternatives include:
  ICI R960 and
  ICI R9000

Although the composition will perform quite satisfactorily when all of the synthetic plastic resin in the composition is a polyurethane, the cost of the composition can be lowered without unacceptably depreciating the quality of the resulting recoated product, by adding some water-dispersed acrylic resin to the composition, providing the proportion of urethane to acrylic resin the composition does not exceed 80:20, typically is 64:40 (and preferably is not lower than 50:50) by weight.

Typically useful as the acrylic resin in the composition is B. F. Goodrich #26084 acrylic resin, which is believed to have the following composition:
- 38–53% anionic emulsion of acrylic ester copolymer
- 47–62% water The liquid in which the polyurethane or polyurethane and acrylic polymer are dispersed to provide the coating composition preferably consists of water. However, at least some of the water can be replaced by another non-polar solvent, such as: methanol Other ingredients necessarily provided in the coating composition include a defoamer and a wetting agent.

A preferred defoamer is: Ashland Chemical, Inc., Drew Industrial Division, Drewplus L405 Foam Control Agent which is believed to have the following composition:
- 40–55% surfactant
- 25–40% silicone
- 1–10% silica
- 9% ethylene glycol monobutyl ether A preferred wetting agent is 3M Cos. Industrial Chemical Products Division, FC-120 Fluorad Fluorochemical Surfactant which is believed to have the following composition:
- 37.5% 2-butoxy ethanol
- 37.5% water
- 25% ammonium perfluoroalkylsulfonate Unless the intent of the user is to provide the consumer product with a colorless coating through which the underlying possibly worn surface will remain visible, the composition preferably includes a pigmented colorant. Examples of a pigmented colorant which can be used include: Hardwick Chemical Corporation Stan-Tone WD-3632 White.

In preferred manufacturing process, the selected ingredients are combined in the following manner to produce the composition:

EXAMPLE 1

As for proportions, the following is a general example of the preferred coating composition:

|  | Parts (by Weight) |
| --- | --- |
| Constituent required: | |
| polyurethane | 30 to 80 |
| acrylic resin | 20 to 50 |
| water | 10 to 30 |
| defoamer | 3 to 10 |
| wetting agent | 5 to 15 |
| optional: | |
| pigmented colorant | 15 to 35 |
| methyl ethyl ketone | 2 to 5 |
| thickening agent (e.g., Rohm & Haas TT678 carboxy methyl cellulose) | 3 to 10 |

The following are two more specific examples of actually useful coating compositions:

EXAMPLE 2

| Constituent | Parts (By Weight) |
| --- | --- |
| polyurethane resin | 50 |
| acrylic resin | 50 |
| water | 10 to 30 |
| defoamer | 10 to 30 |
| wetting agent | 7 to 20 |
| pigment color | 25 to 40 |

EXAMPLE 3

| Constituent | Parts (By Weight) |
| --- | --- |
| polyurethane resin | 100 |
| acrylic resin | none |
| water | 10 to 30 |
| defoamer | 5 to 15 |
| wetting agent | 4 to 20 |
| pigment color | 15 to 50 |
| methyl ethyl ketone | 1 to 2 |

The coating composition is preferably applied by using a conventional brush, sponge, swab, wiper, or the like to spread on a thin coating, which is preferably allowed to air dry at room temperature. The coating is acceptably dry when it appears to be dry to the touch. Typically, drying time is 30 minutes (at an ambient temperature of 70° F. and an ambient humidity of 85 percent) without use of any forced drying techniques such as a fan or an oven.

The coating is preferably applied so thinly that one ounce of the coating composition covers from 10 to 25 square inches of the surface of the leather or leather-like substrate.

It should now be apparent that the method and composition for recoloring worn leather and leather-like consumer products such as shoes as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for recoloring a scuffed or worn external surface of a leather or synthetic or artificial leather article, comprising:
   (a) cleaning a scuffed or worn external surface of a leather or synthetic or artificial leather article which is to be recolored;
   (b) applying to the cleaned surface a coating composition of polyurethane elastomer dispersed in water further containing a colorant, a defoamer and a wetting agent so that said coating composition has a coverage ratio of one ounce of coating composition per 10-25 square inches on said surface and said surface thereby has a substantially continuous coating of said coating composition; and
   (c) permitting the water to evaporate at room temperature, leaving a substantially continuous thin, flexible, scuff-resistant coating on said surface, thereby covering and hiding discoloration and scuffs on said surface.

2. The method of claim 1, wherein:

said coating composition further includes acrylic resin dispersed in water and the proportion of polyurethane elastomer to acrylic resin in said coating composition is from 80:20 to 50:50, by weight.

3. The method of claim 1, wherein:
in step (b), the coating composition is applied to a cleaned surface of a worn shoe.

4. The method of claim 1, wherein:
in step (b), the coating is applied by brushing.

5. The method of claim 1, wherein:
in step (b), the coating is applied by swabbing.

6. The method of claim 1, wherein:
in step (a), the surface is cleaned by applying thereto a cleaning agent selected from the group consisting of ethyl acetate, isopropyl alcohol, methyl ethyl ketone, methylisobutyl ketone, soap, detergent, and water, and then wiping said surface.

7. A recolored leather or synthetic or artificial leather article having a scuffed or worn external surface thereof coated by the method of claim 1.

* * * * *